US010183550B2

(12) United States Patent
Gebbie et al.

(10) Patent No.: US 10,183,550 B2
(45) Date of Patent: Jan. 22, 2019

(54) METHOD AND SYSTEM FOR HEATING A VEHICLE

(71) Applicant: Ford Global Technologies, LLC, Dearborn, MI (US)

(72) Inventors: James George Gebbie, Rochester Hills, MI (US); Clay Wesley Maranville, Ypsilanti, MI (US); Timothy Noah Blatchley, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 14/792,222

(22) Filed: Jul. 6, 2015

(65) Prior Publication Data
US 2015/0308719 A1    Oct. 29, 2015

Related U.S. Application Data

(63) Continuation-in-part of application No. 14/010,057, filed on Aug. 26, 2013, now Pat. No. 10,131,205.

(51) Int. Cl.
| F25B 13/00 | (2006.01) |
| F25D 21/06 | (2006.01) |
| B60H 1/00 | (2006.01) |

(52) U.S. Cl.
CPC ............... B60H 1/00921 (2013.01); B60H 2001/00928 (2013.01)

(58) Field of Classification Search
CPC .............. B60H 2001/00928; B60H 1/00921
USPC ............................................ 62/324.1, 71, 79
See application file for complete search history.

(56) References Cited

U.S. PATENT DOCUMENTS

| 6,192,695 B1* | 2/2001 | Hirota .................... F25B 41/04 62/159 |
| 2001/0020529 A1 | 9/2001 | Karl | |
| 2002/0043413 A1* | 4/2002 | Kimishima ............ B60H 1/323 180/68.1 |
| 2004/0187506 A1* | 9/2004 | Iwanami .............. B60H 1/3222 62/236 |
| 2005/0039878 A1 | 2/2005 | Meyer et al. | |

(Continued)

FOREIGN PATENT DOCUMENTS

| CN | 201506355 U | 6/2010 |
| CN | 202734185 U | 2/2013 |
| EP | 2090448 A1 | 8/2009 |

OTHER PUBLICATIONS

State Intellectual Property Office of the People's Republic of China, Office Action and Search Report Issued in Application No. 201410418949.3, dated Dec. 4, 2017, 11 pages. (Submitted with Partial Translation).

(Continued)

Primary Examiner — Ljiljana V. Ciric
Assistant Examiner — Kirstin U Oswald
(74) Attorney, Agent, or Firm — David Kelley; McCoy Russell LLP

(57) ABSTRACT

Methods and systems for providing controlling environmental conditions in a passenger compartment of a vehicle are presented. In one example, various low cost expansion valves are included in a system that has a receiver positioned downstream of an exterior heat exchanger to provide a climate control system with heating, cooling, dehumidification, and de-icing modes.

20 Claims, 7 Drawing Sheets

(56) References Cited

U.S. PATENT DOCUMENTS

| | | | |
|---|---|---|---|
| 2005/0126218 A1* | 6/2005 | Sohn | F25B 41/04 62/527 |
| 2008/0202722 A1 | 8/2008 | Feuerecker et al. | |
| 2009/0130513 A1* | 5/2009 | Tsuchiya | B60H 1/00385 429/412 |
| 2009/0249807 A1* | 10/2009 | Nemesh | B60H 1/00278 62/117 |
| 2010/0077777 A1* | 4/2010 | Lifson | F25B 9/008 62/117 |
| 2010/0281901 A1* | 11/2010 | Kawase | B60H 1/00885 62/238.7 |
| 2010/0326127 A1 | 12/2010 | Oomura et al. | |
| 2011/0109157 A1 | 5/2011 | Tani | |
| 2011/0113800 A1* | 5/2011 | Sekiya | B60H 1/00278 62/151 |
| 2011/0174000 A1* | 7/2011 | Richter | B60H 1/00064 62/93 |
| 2012/0179329 A1 | 7/2012 | Okamoto et al. | |
| 2012/0297805 A1* | 11/2012 | Kamada | B60H 1/00278 62/208 |
| 2013/0019615 A1 | 1/2013 | Choi et al. | |
| 2013/0139528 A1 | 6/2013 | Katayama et al. | |
| 2013/0219939 A1 | 8/2013 | Eisenhour | |
| 2015/0183296 A1 | 7/2015 | Ragazzi | |
| 2015/0210141 A1 | 7/2015 | Ragazzi | |

OTHER PUBLICATIONS

State Intellectual Property Office of the People's Republic of China, Office Action and Search Report Issued in Application No. 201410418949.3, dated Sep. 3, 2018, 43 pages. (Submitted with Partial Translation).

\* cited by examiner

METHOD AND SYSTEM FOR HEATING A VEHICLE

CROSS REFERENCE TO RELATED APPLICATIONS

The present application is a continuation-in-part of U.S. patent application Ser. No. 14/010,057, entitled "CLIMATE CONTROL SYSTEM," filed on Aug. 26, 2013, the entire contents of which are hereby incorporated by reference for all purposes.

FIELD

The present description relates to methods and a system for providing climate control for a vehicle. The methods and system may be particularly useful for vehicles that are solely electrically propelled or vehicles that include hybrid powertrains.

BACKGROUND AND SUMMARY

Environmental conditions of a vehicle's passenger compartment may be adjusted via a heat pump. The heat pump may include expansion valves that have electrically controlled variable orifices (e.g., electrically operated variable expansion valves). By adjusting orifice area, refrigerant flow through the heat pump may be controlled to provide desired passenger compartment environmental conditions. However, expansion valves that have electrically controlled variable orifices may be expensive. Further, a controller including sensors and instructions to operate the expansion valve may further increase system cost and complexity.

The inventors herein have recognized the above-mentioned disadvantages and have developed a vehicle system, comprising: a coolant loop including a heater core in a passenger compartment; and a refrigerant loop including a thermal expansion valve that does not include an electrically variable orifice positioned upstream of a heat exchanger in the passenger compartment, the refrigerant loop fluidically isolated from the coolant loop, the refrigerant loop in thermal communication with the coolant loop via an intermediate heat exchanger.

By applying thermal expansion valves in a climate control system instead of electrically operated variable expansion valves, it may be possible to provide the technical result of reducing climate control system cost while maintaining desirable climate control system operating modes. For example, thermal expansion valves may be applied in a system that operates in cooling mode, heating mode, dehumidification mode, and de-icing mode. Use of electrically operated variable expansion valves may be facilitated by strategic placement of a coolant receiver in the climate control system. In one example, the receiver may be fluidically coupled to an exterior heat exchanger so that refrigerant enters the receiver in a saturated state, thereby reducing the possibility of vaporizing liquid refrigerant stored in the receiver.

The present description may provide several advantages. Specifically, the approach may improve passenger compartment heating and cooling of electric and hybrid vehicles. Further, the approach may reduce system cost. Further still, the approach may reduce system complexity.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an example, referred to herein as the Detailed Description, when taken alone or with reference to the drawings, where.

DETAILED DESCRIPTION

Figure 1A:
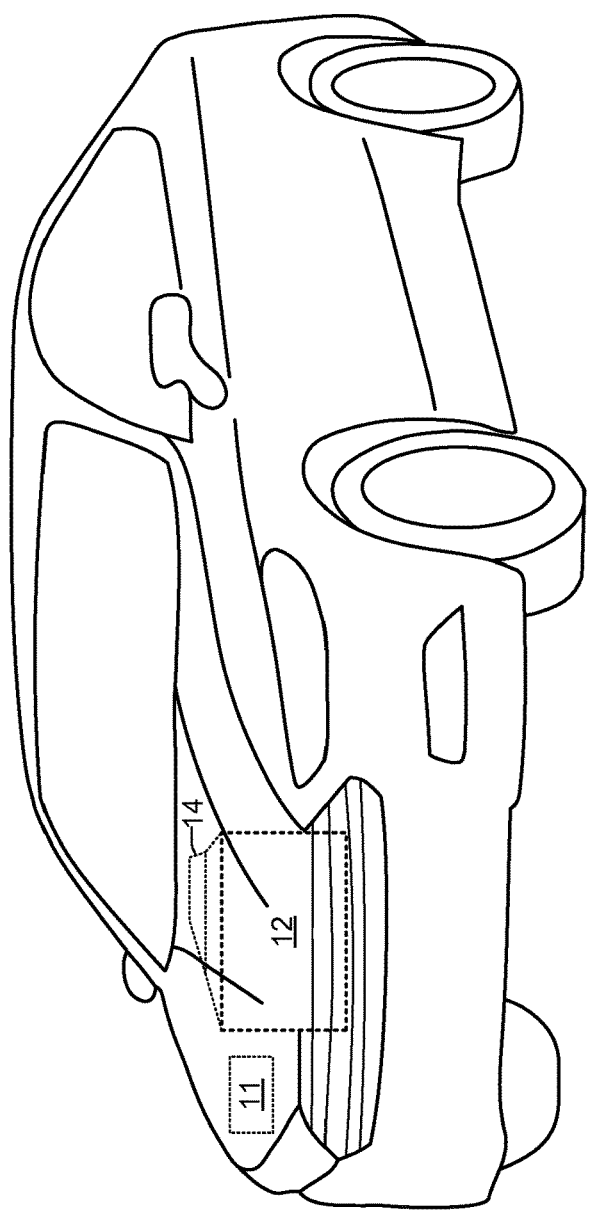
FIG. 1A is a schematic diagram of a vehicle.
Figure 1B:
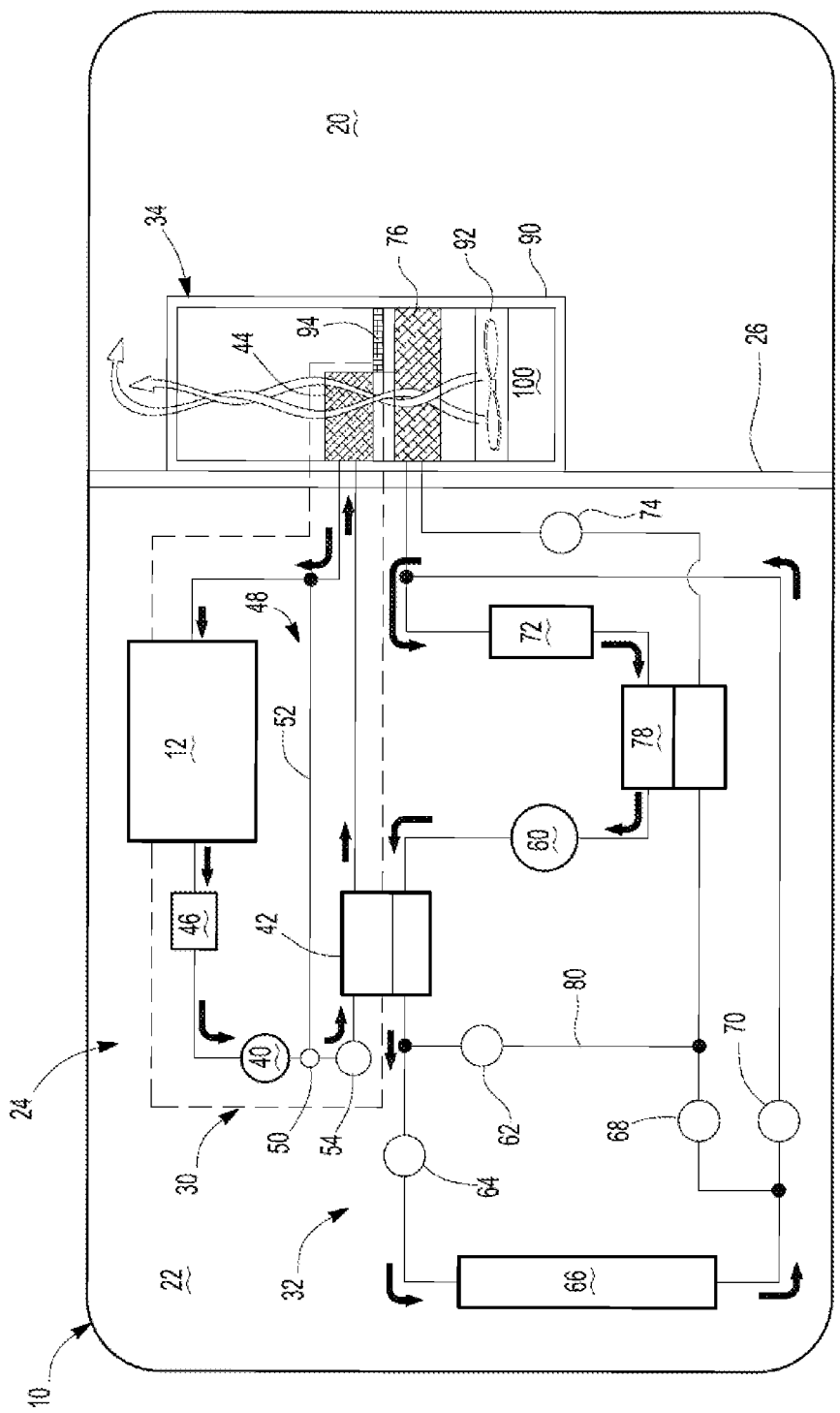
FIG. 1B shows an example vehicle climate control system for the vehicle of FIG. 1.

The present description is related to providing a climate control system for a vehicle. The vehicle climate control system may be included in an electric or hybrid vehicle as is shown in FIG. 1A. In one example, the climate control system includes a thermal expansion valve (TXV) positioned upstream of an interior heat exchanger as shown in FIG. 1B. Alternatively, the climate control system may be configured with a TXV upstream of the interior heat exchanger in the system of FIG. 2. The system of FIG. 2 may be operated in the modes indicated in FIGS. 2-5. A method for transitioning between the various operating modes is shown in FIG. 6.

Referring to FIG. 1A, a vehicle 10 including an engine 12, an electrical machine 14, and an electrical energy storage device 11 is shown. In one example, the vehicle may be propelled solely via the engine 12, solely via the electrical machine 14, or by both the engine 12 and the electrical machine 14. The electrical machine may be supplied electrical power via the electrical energy storage device 11. The electrical energy storage device 11 may be recharged via engine 12 providing power to electrical machine 14 and electrical machine outputting electrical energy to electric energy storage device 11. Alternatively, electrical energy storage device may be recharged via converting the vehicle's kinetic energy into electrical energy via electrical machine 14 during vehicle deceleration or hill descent. Electrical energy storage device 11 may also be recharged from a stationary power grid via a home charging system or a remote charging system (e.g., a charging station). In one example, electrical energy storage device 11 is a battery. Alternatively, electrical energy storage device 11 may be a capacitor or other storage device.

Referring to FIG. 1B, a schematic representation of a vehicle 10 with a climate control system 24 is shown. The vehicle 10 may have any suitable drivetrain and may include an engine 12 that may be used to propel the vehicle 10 and/or power vehicle components. In FIG. 1B, the vehicle 10 is shown with a single engine 12 that may be configured as an internal combustion engine that may be adapted to combust any suitable type of fuel, such as gasoline, diesel fuel, or hydrogen. As another option, vehicle 10 may be configured as a hybrid vehicle that may have a plurality of power sources, such as a non-electrical power source like an engine and an electrical power source as is shown in FIG. 1A. The vehicle 10 may include a passenger compartment 20, an engine compartment 22, and a climate control system 24.

The passenger compartment 20 may be disposed inside the vehicle 10 and may receive one or more occupants. A portion of the climate control system 24 may be disposed in the passenger compartment 20.

The engine compartment 22 may be disposed proximate the passenger compartment 20. One or more engine 12 as well as a portion of the climate control system 24 may be disposed in the engine compartment 22. The engine compartment 22 may be separated from the passenger compartment 20 by a bulkhead 26.

The climate control system 24 may circulate air and/or control or modify the temperature of air that is circulated in the passenger compartment 20. The climate control system 24 may include a coolant subsystem 30, a heat pump subsystem 32, and a ventilation subsystem 34.

The coolant subsystem 30, which may also be referred to as a coolant loop, may circulate a fluid, such as coolant, to cool the engine 12 or electric machine (not shown). For example, waste heat that is generated by the engine 12 when the engine is running or operational may be transferred to the coolant and then circulated to one or more heat exchangers to transfer thermal energy from the coolant. In at least one example, the coolant subsystem 30 may include a coolant pump 40, an intermediate heat exchanger 42, a heater core 44, an optional coolant heater 46, and a bypass loop 48 that may be fluidly interconnected by conduits such as tubes, hoses, pipes, or the like. The coolant subsystem 30 may also include a radiator (not shown) that may be disposed in the engine compartment 22 for transferring thermal energy to the ambient air surrounding the vehicle 10.

The coolant pump 40 may circulate coolant through the coolant subsystem 30. The coolant pump 40 may be powered by an electrical or non-electrical power source. For example, the coolant pump 40 may be operatively coupled to a engine 12 configured as an internal combustion engine via a belt or may be driven by an electrically powered motor. The coolant pump 40 may receive coolant from the engine 12 and circulate the coolant in a closed loop. For instance, when the climate control system 24 is in a heating mode, coolant may be routed from the coolant pump 40 to the intermediate heat exchanger 42 and then to the heater core 44 before returning to the engine 12 as represented by the arrowed lines.

The intermediate heat exchanger 42 may facilitate the transfer of thermal energy between the coolant subsystem 30 and the heat pump subsystem 32. The intermediate heat exchanger 42 may be part of the coolant subsystem 30 and the heat pump subsystem 32. The intermediate heat exchanger 42 may have any suitable configuration. For instance, the intermediate heat exchanger 42 may have a plate-fin, tube-fin, or tube-and-shell configuration that may facilitate the transfer of thermal energy without mixing the heat transfer fluids in the coolant subsystem 30 and heat pump subsystems 32. Heat may be transferred from the heat pump subsystem 32 to the coolant via the intermediate heat exchanger 42 when the climate control system 24 is in a heating mode or dehumidification mode as will be discussed in more detail below.

The heater core 44 may transfer thermal energy from the coolant to air in the passenger compartment 20. The heater core 44 may be disposed in the passenger compartment 20 in the ventilation subsystem 34 and may have any suitable configuration. For example, the heater core 44 may have a plate-fin or tube-fin construction in one or more examples.

The coolant subsystem 30 may optionally include a coolant heater 46 that heats the coolant. In at least one example, the coolant heater 46 may be an electrical coolant heater, such as a high voltage coolant heater or low voltage coolant heater that may be disposed upstream of the heater core 44 and that may use electrical energy to heat the coolant. An electrical coolant heater may receive power from an electrical power source on the vehicle 10 and/or an electrical power source remote from the vehicle 10, such as via an electrical outlet. Alternatively or in addition, the coolant heater 46 may be a non-electrical coolant heater, such as a fuel-operated or fuel powered heater.

The bypass loop 48 may route coolant such that the coolant is not heated by the power source 12 or engine. A bypass loop control valve 50 may control the flow of coolant through the bypass loop 48. More specifically, the bypass loop control valve 50 may permit coolant to flow through a bypass line 52 and inhibit the flow of coolant from the power source 12 to the intermediate heat exchanger 42 when in a first position. In such a position, a second coolant pump 54 may circulate coolant through the bypass loop 48 from the intermediate heat exchanger 42 to the heater core 44 to the bypass line 52 and back to the second coolant pump 54. As such, the coolant in the coolant subsystem 30 may be heated independently by the heat pump subsystem 32 via the intermediate heat exchanger 42 in some operation modes. The bypass loop control valve 50 may also inhibit the flow of coolant through the bypass line 52 when in a second position. The second coolant pump 54 may or may not circulate coolant when coolant does not flow through the bypass line 52.

The heat pump subsystem 32 may transfer thermal energy to or from the passenger compartment 20 and to or from the coolant subsystem 30. In at least one example, the heat pump subsystem 32 may be configured as a vapor compression heat pump subsystem in which a fluid is circulated through the heat pump subsystem 32 to transfer thermal energy to or from the passenger compartment 20. The heat pump subsystem 32 may operate in various modes, including, but not limited to a cooling mode and a heating mode. In the cooling mode, the heat pump subsystem 32 may circulate a heat transfer fluid, which may be called a refrigerant, to transfer thermal energy from inside the passenger compartment 20 to outside the passenger compartment 20. In a heating mode, the heat pump subsystem 32 may transfer thermal energy from the refrigerant to the coolant via the intermediate heat exchanger 42 without circulating the refrigerant through a heat exchanger in the passenger compartment 20 as will be discussed in more detail below. For brevity, an abbreviated discussion of the heat pump subsystem 32 is provided below that focuses on a vapor compression cycle that may be employed in the heating mode. In such a configuration, the heat pump subsystem 32 may include a pump or compressor 60, a first control valve 62, a first expansion device 64, an exterior heat exchanger 66, a second control valve 68, a third control valve 70, an accumulator 72 (also sometimes referred to as a receiver), a second expansion device 74, an interior heat exchanger 76, and an optional internal heat exchanger 78. Components of the heat pump subsystem 32 may be fluidly connected in a closed loop via one or more conduits, such as a tube, hose or the like. In FIG. 1B, the refrigerant circulation path when in the heating mode is represented by the arrowed lines.

The pump 60, which may also be called a compressor, may pressurize and circulate the refrigerant through the heat pump subsystem 32. The pump 60 may be powered by an electrical or non-electrical power source. For example, the pump 60 may be operatively coupled to a power source 12 configured as an internal combustion engine via a belt or may be driven by an electrically powered motor. In a heating mode, the pump 60 may provide high pressure refrigerant to the intermediate heat exchanger 42, which in turn may transfer heat from the high pressure refrigerant to coolant passing through the intermediate heat exchanger 42 to heat the coolant in coolant loop 30.

The first control valve 62 may be disposed along a bypass path 80 that may be disposed between the intermediate heat exchanger 42 and the first expansion device 64. The bypass path 80 may permit some refrigerant to bypass the first expansion device 64 and the exterior heat exchanger 66 and flow to the internal heat exchanger 78 (if provided), the second expansion device 74, and the interior heat exchanger 76 when the first control valve 62 is open. The first control valve 62 may be closed to inhibit the flow of refrigerant through the bypass path 80 to the interior heat exchanger 76 when in heating mode.

The first expansion device 64 may be disposed between and may be fluidly connected to the intermediate heat exchanger 42 and the exterior heat exchanger 66. The first expansion device 64 may be provided to change the pressure of the refrigerant. For instance, the first expansion device 64 may be a thermal expansion valve (TXV) or a fixed or variable position valve that may or may not be externally controlled. The first expansion device 64 may reduce the pressure of the refrigerant that passes through the first expansion device 64 from the intermediate heat exchanger 42 to the exterior heat exchanger 66. As such, high pressure refrigerant liquid received from the intermediate heat exchanger 42 may exit the first expansion device 64 at a lower pressure and as a liquid and vapor mixture in the heating mode.

The exterior heat exchanger 66 may be disposed outside the passenger compartment 20. In a cooling mode or air conditioning context, the exterior heat exchanger 66 may function as a condenser and may transfer heat to the surrounding environment to condense the refrigerant from a vapor to liquid. In a heating mode, the exterior heat exchanger 66 may function as an evaporator and may transfer heat from the surrounding environment to the refrigerant, thereby causing the refrigerant to vaporize.

The second control valve 68 may be disposed between the exterior heat exchanger 66 and the bypass path 80. The second control valve 68 may be configured as a check valve and may prevent refrigerant flow through third control valve 70 and bypassing interior heat exchanger 76. As such, refrigerant exiting the exterior heat exchanger 66 when the climate control system 24 is in the heating mode may be routed to the third control valve 70.

A third control valve 70 may be disposed between the exterior heat exchanger 66 and the accumulator 72. The third control valve 70 may help control the flow of refrigerant that exits the exterior heat exchanger 66. In the heating mode, the third control valve 70 may be open to permit refrigerant to flow from the exterior heat exchanger 66 to the accumulator 72. The third control valve 70 may be closed and the second expansion device 74 may be opened in other modes, such as a cooling mode.

The accumulator 72 may act as a reservoir for storing any residual liquid refrigerant so that vapor refrigerant rather than liquid refrigerant may be provided to the pump 60. The accumulator 72 may include a desiccant that absorbs small amounts of water moisture from the refrigerant.

The second expansion device 74 may be disposed between and may be fluidly connected to the exterior heat exchanger 66 and the interior heat exchanger 76. The second expansion device 74 may have a similar configuration as the first expansion device 64 and may be provided to change the pressure of the refrigerant similar to the first expansion device 64. In addition, the second expansion device 74 may be closed to inhibit the flow of refrigerant. More specifically, the second expansion device 74 may be closed to inhibit the flow of refrigerant from the exterior heat exchanger 66 to the interior heat exchanger 76 in the heating mode. As such, closing the second expansion device 74 may inhibit the flow of refrigerant through the second control valve 68 to the internal heat exchanger 78 (if provided), as well as through the interior heat exchanger 76.

The interior heat exchanger 76 may be fluidly connected to the second expansion device 74. The interior heat exchanger 76 may be disposed inside the passenger compartment 20. In a cooling mode or air conditioning context, the interior heat exchanger 76 may function as an evaporator and may receive heat from air in the passenger compartment 20 to vaporize the refrigerant. Refrigerant exiting the interior heat exchanger 76 may be routed to the accumulator 72. In the heating mode, refrigerant may not be routed to the interior heat exchanger 76 due to the closure of the second expansion device 74.

The internal heat exchanger 78, if provided, may transfer thermal energy between refrigerant flowing through different regions of the heat pump subsystem 32. The internal heat exchanger 78 may be disposed outside the passenger compartment 20. In a cooling mode or air conditioning context, heat may be transferred from refrigerant that is routed from the exterior heat exchanger 66 to the interior heat exchanger 76 to refrigerant that is routed from the accumulator 72 to the pump 60. In the heating mode, the internal heat exchanger 78 does not transfer thermal energy between such refrigerant flow paths since the second expansion device 74 is closed, thereby inhibiting the flow of refrigerant through a portion of the internal heat exchanger 78.

The ventilation subsystem 34 may circulate air in the passenger compartment 20 of the vehicle 10. The ventilation subsystem 34 may have a housing 90, a blower 92, and a temperature door 94.

The housing 90 may receive components of the ventilation subsystem 34. In FIG. 1B, the housing 90 is illustrated such that internal components are visible rather than hidden for clarity. In addition, airflow through the housing 90 and internal components is represented by the arrowed line. The housing 90 may be at least partially disposed in the passenger compartment 20. For example, the housing 90 or a portion thereof may be disposed under an instrument panel of the vehicle 10. The housing 90 may have an air intake portion 100 that may receive air from outside the vehicle 10 and/or air from inside the passenger compartment 20. For example, the air intake portion 100 may receive ambient air from outside the vehicle 10 via an intake passage, duct, or opening that may be located in any suitable location, such as proximate a cowl, wheel well, or other vehicle body panel. The air intake portion 100 may also receive air from inside the passenger compartment 20 and recirculate such air through the ventilation subsystem 34. One or more doors or louvers may be provided to permit or inhibit air recirculation.

The blower 92 may be disposed in the housing 90. The blower 92, which may also be called a blower fan, may be disposed near the air intake portion 100 and may be configured as a centrifugal fan that may circulate air through the ventilation subsystem 34.

The temperature door 94 may be disposed between the interior heat exchanger 76 and the heater core 44. In the example shown, the temperature door 94 is disposed downstream of the interior heat exchanger 76 and upstream of the heater core 44. The temperature door 94 may block or permit airflow through the heater core 44 to help control the temperature of air in the passenger compartment 20. For instance, the temperature door 94 may permit airflow through the heater core 44 in the heating mode such that heat may be transferred from the coolant to air passing through the heater core 44. This heated air may then be provided to a plenum for distribution to ducts and vents or outlets located in the passenger compartment 20. The temperature door 94 may move between a plurality of positions to provide air having a desired temperature. In FIG. 1B, the temperature door 94 is shown in a full heat position in which airflow is directed through the heater core 44.

Optionally, a supplemental heater or supplemental heat source (not shown) may be provided with the ventilation subsystem 34. For example, an electric or electrically powered heater like a resistance wire heater, a positive temperature coefficient (PTC) heater, or a thermoelectric device.

Referring now to FIGS. 2-5, an alternative climate control system 24 is shown. Components of the system shown in FIGS. 2-5 that are the same as components described in the system of FIG. 1B use the same numerical labels. For example, exterior heat exchanger 66 shown in FIG. 1B and exterior heat exchanger 66 shown in FIG. 2 have the same numerical label 66. Further, the devices of FIGS. 2-5 that are indicated with the same labels shown in FIG. 1B operate in a same way as discussed in the description of FIG. 1B unless otherwise indicated.

Devices and fluidic passages or conduits are shown as solid lines in FIGS. 2-5. Electrical connections are shown as dashed lines in FIGS. 2-5. In this example, coolant subsystem 30 is shown without an engine or electric machine that propels vehicle 10, but one may be included as shown in FIG. 1B.

Each of the devices shown in FIGS. 2-5 that are fluidically coupled via conduits (e.g., solid lines) have an inlet and an outlet based on the direction of flow direction arrows 204, 206, 302, 304, 402, 404, 406, and 504. Inlets of the devices are locations where the conduit enters the device in the direction of flow according to the flow direction arrows. Outlets of the devices are locations where the conduit exits the device in the direction of flow according to the flow direction arrows. Refrigerant flow in this description is defined as starting at pump 60 and proceeding in the direction of the arrows. Thus, pump 60 is a farthest upstream device according to the direction of refrigerant flow. A similar convention applies to coolant pump 40 and battery chiller pump 224.

The coolant pump 40 may circulate coolant through the coolant subsystem 30. The coolant pump 40 may be powered by an electrical or non-electrical power source.

Pump 60 is directly coupled to intermediate heat exchanger 42 via conduit. Intermediate heat exchanger 42 may facilitate the transfer of thermal energy between the coolant subsystem 30 and the heat pump subsystem 32. In particular, heat may be transferred from heat pump subsystem 32 to coolant subsystem 30. The intermediate heat exchanger 42 may be part of the coolant subsystem 30 and the heat pump subsystem 32, and it may facilitate the transfer of thermal energy from heat pump subsystem 32 to coolant subsystem 30 without mixing or exchanging the heat transfer fluids in the coolant subsystem 30 and heat pump subsystems 32.

Intermediate heat exchanger 42 is shown directly coupled to bypass valve 262 and fixed area expansion device 264. Fixed area expansion device 264 is a passive device not controlled via controller 212. Fixed area expansion device bypass valve 262 may be selectively opened and closed via controller 212. When fixed area expansion device bypass valve 262 is in an open position, it provides a path of least fluidic resistance to exterior heat exchanger 66 such that there is little pressure drop across fixed area expansion device 264. Fixed area expansion device 264 and fixed area expansion device bypass valve 262 are shown directly coupled to exterior heat exchanger 66. Exterior heat exchanger 66 is shown directly coupled to receiver 72. Receiver 72 is directly coupled to internal heat exchanger 78 and internal heat exchanger bypass valve 222.

Internal heat exchanger bypass valve 222 is directly coupled to internal heat exchanger 78. Internal heat exchanger 78 is directly coupled to TXV 74 and battery chiller TXV 274. TXV 74 is directly coupled to interior heat exchanger 76. Battery chiller TXV 274 is directly coupled to battery chiller heat exchanger 236. In this example, battery chiller TXV 274 and TXV 74 include shut-off valves for preventing flow through the respective valves and their respective orifices are not electrically controlled. Interior heat exchanger 76 is directly coupled to internal heat exchanger 78. Internal heat exchanger 78 is directly coupled to pump 60. Battery chiller heat exchanger 236 is directly coupled to internal heat exchanger 78.

Battery chiller loop 235 includes battery 220, battery chiller pump 224, and battery chiller heat exchanger 236. Heat from battery 220 may be rejected to refrigerant flowing through batter chiller heat exchanger 236.

The ventilation subsystem 34 may circulate air in the passenger compartment 20 of the vehicle 10. In addition, airflow through the housing 90 and internal components is represented by the arrowed lines 277.

Figure 2:
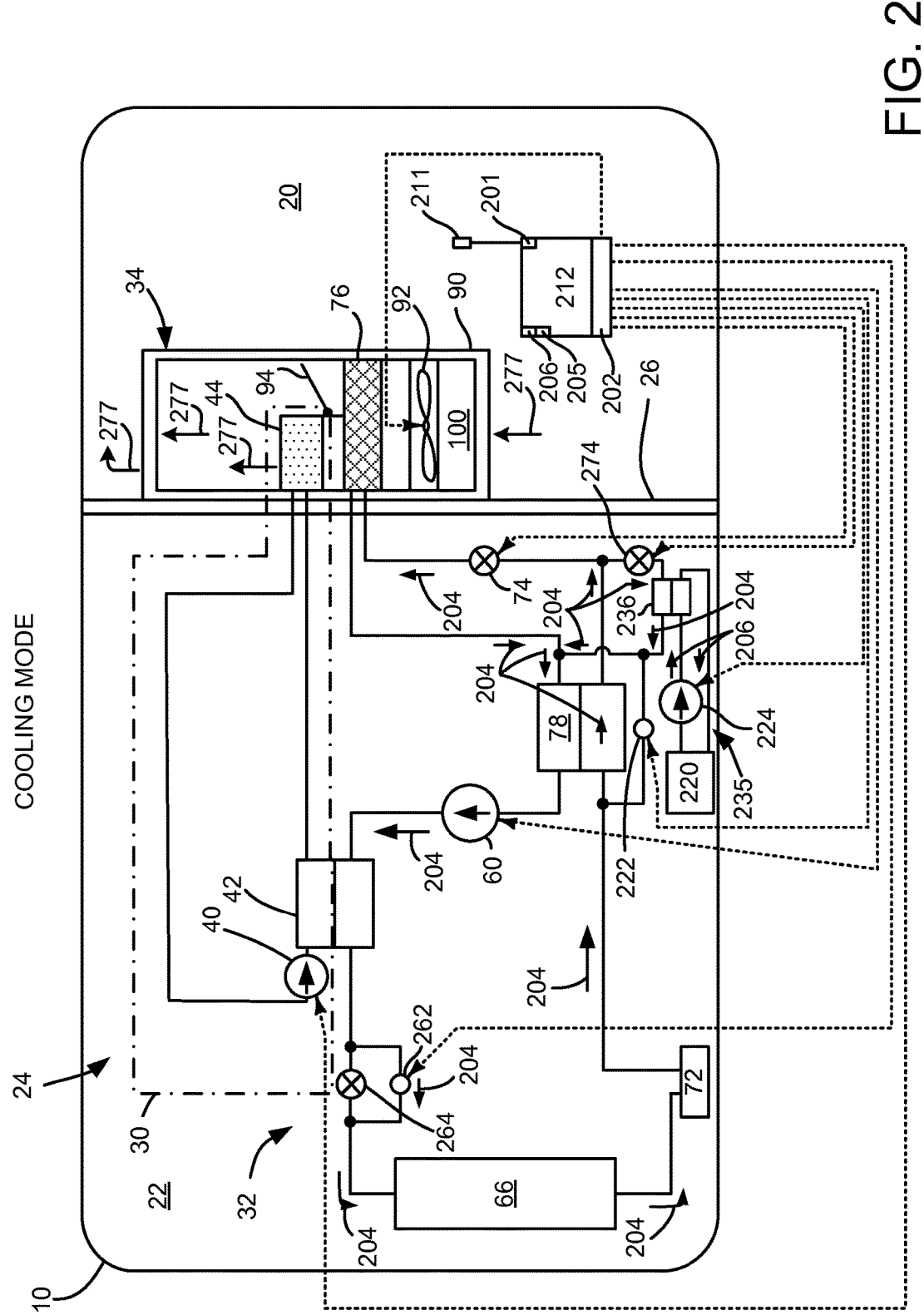
FIG. 2 shows an alternative vehicle climate control system for the vehicle of FIG. 1 operating in a cooling mode.

Controller 212 includes executable instructions of the method in FIG. 6 to operate the valves, fans, and pumps or compressors of the system shown in FIG. 2. Controller 212 includes inputs 201 and outputs 202 to interface with devices in the system of FIG. 2. Controller 212 also includes a central processing unit 205 and non-transitory memory 206 for executing the method of FIG. 6. Temperature sensors similar to temperature sensor 211 may be located at various positions in the system including but not limited to at interior heat exchanger 76.

The system of FIG. 2 may be operated in a cooling mode. In cooling mode, passenger compartment 20 may be cooled. The cooling mode is activated by opening fixed area expansion device bypass valve 262, opening the shut-off valve of TXV 74, closing internal heat exchanger bypass valve 222, activating pump 60, and activating fan 92. TXV 274 and battery chiller pump 224 may be selectively activated when the system is operated in cooling mode to provide battery cooling. During cooling mode, refrigerant flows through heat pump subsystem 32 in the direction of arrows 204. Coolant flows in battery chiller loop 236 in the direction indicated by arrows 206. Thus, in cooling mode, refrigerant exits pump 60 and enters intermediate heat exchanger 42. The refrigerant then moves through the fixed area expansion device bypass valve 262, thereby making the fixed area expansion valve 264 irrelevant. Refrigerant travels from the fixed area expansion device bypass valve 262 to the exterior heat exchanger 66 which operates as a condenser. The condensed refrigerant then enters receiver 72 where it may accumulate depending on demand. Receiver 72 is not placed downstream of interior heat exchanger 76 because refrigerant that exits interior heat exchanger 76 in cooling mode is superheated. If receiver 76 were placed downstream of interior heat exchanger 76, the superheated vapor would vaporize any condensed refrigerant in the receiver, thereby reducing the effectiveness of the receiver.

Liquid refrigerant exits receiver 72 and passes through internal heat exchanger 78 where heat may be transferred from hot liquid refrigerant to the cool refrigerant vapor entering internal heat exchanger 78 from interior heat exchanger 76. The liquid refrigerant then enters TXV 74 and battery chiller TXV 274 where it expands to provide cooling to passenger compartment 20 and battery chiller loop 235. Heat is transferred from coolant circulating in battery chiller loop 235 to refrigerant in heat pump subsystem 32 via battery chiller heat exchanger 236. Likewise, heat is transferred from passenger compartment 20 to refrigerant in heat pump subsystem 32 via interior heat exchanger 76. Battery chiller heat exchanger 236 and interior heat exchanger 76 operate as evaporators in cooling mode. The heated refrigerant is directed to internal heat exchanger 78 before it is returned to pump 60 to be recirculated.

Figure 3:
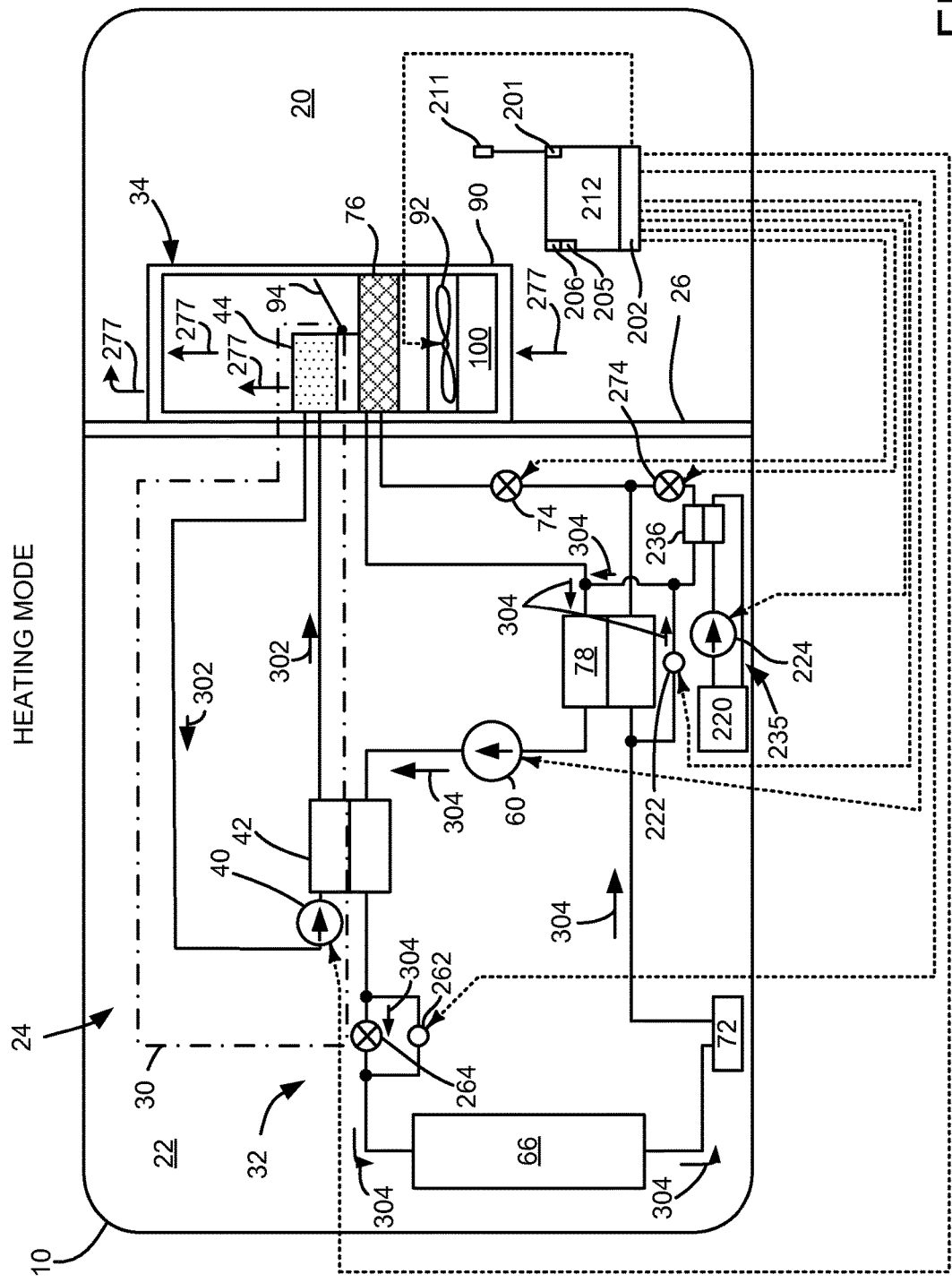
FIG. 3 shows the vehicle climate control system of FIG. 2 operating in a heating mode.

Referring now to FIG. 3, climate control system 24 is the same as climate control system 24 shown in FIG. 2; however, FIG. 3 shows climate control system 24 operating in a heating mode. In heating mode, passenger compartment 20 may be warmed. The heating mode is activated by closing fixed area expansion device bypass valve 262, closing the shut-off valve of battery chiller TXV 274, closing the shut-off valve of TXV 74, opening internal heat exchanger bypass valve 222, activating pump 60, activating fan 92, and activating coolant pump 40. During heating mode, refrigerant flows through heat pump subsystem 32 (also known as the refrigerant loop) in the direction of arrows 304. Coolant flows in coolant subsystem 30 in the direction indicated by arrows 302.

In heating mode, refrigerant exits pump 60 and enters intermediate heat exchanger 42 which operates as a condenser. Heat is transferred from refrigerant to coolant in coolant subsystem 30 via intermediate heat exchanger 42. Coolant circulating in coolant subsystem 30 is heated at intermediate heat exchanger 42 before it enters heater core 44 where passenger compartment air extracts heat from the coolant. Coolant is then returned to coolant pump 40 to be recirculated.

The refrigerant exits intermediate heat exchanger 42 and moves through fixed area expansion device 264, and not fixed area expansion device bypass valve 262, so that refrigerant expansion occurs. Refrigerant travels from the fixed area expansion device valve 264 to the exterior heat exchanger 66 which operates as an evaporator. The vaporized refrigerant then enters receiver 72 where it may accumulate depending on demand. If the refrigerant is in a liquid-vapor mixture, then the liquid is separated from the vapor and the vapor continues on. If the refrigerant is only vapor, the vapor passes through receiver 72. Consequently, liquid refrigerant is not vaporized in receiver 72 when exterior heat exchanger 66 operates as an evaporator. Thus, the location of receiver 72 provides benefits that may not be realized if receiver 72 was located at other positions within the system.

Refrigerant exits receiver 72 and passes through internal heat exchanger bypass valve 222. The refrigerant then passes through a second side of internal heat exchanger 78 before returning to pump 60 where its temperature and pressure are increased. Refrigerant does not flow through interior heat exchanger 76 and battery chiller heat exchanger 236 in heating mode.

Figure 4:
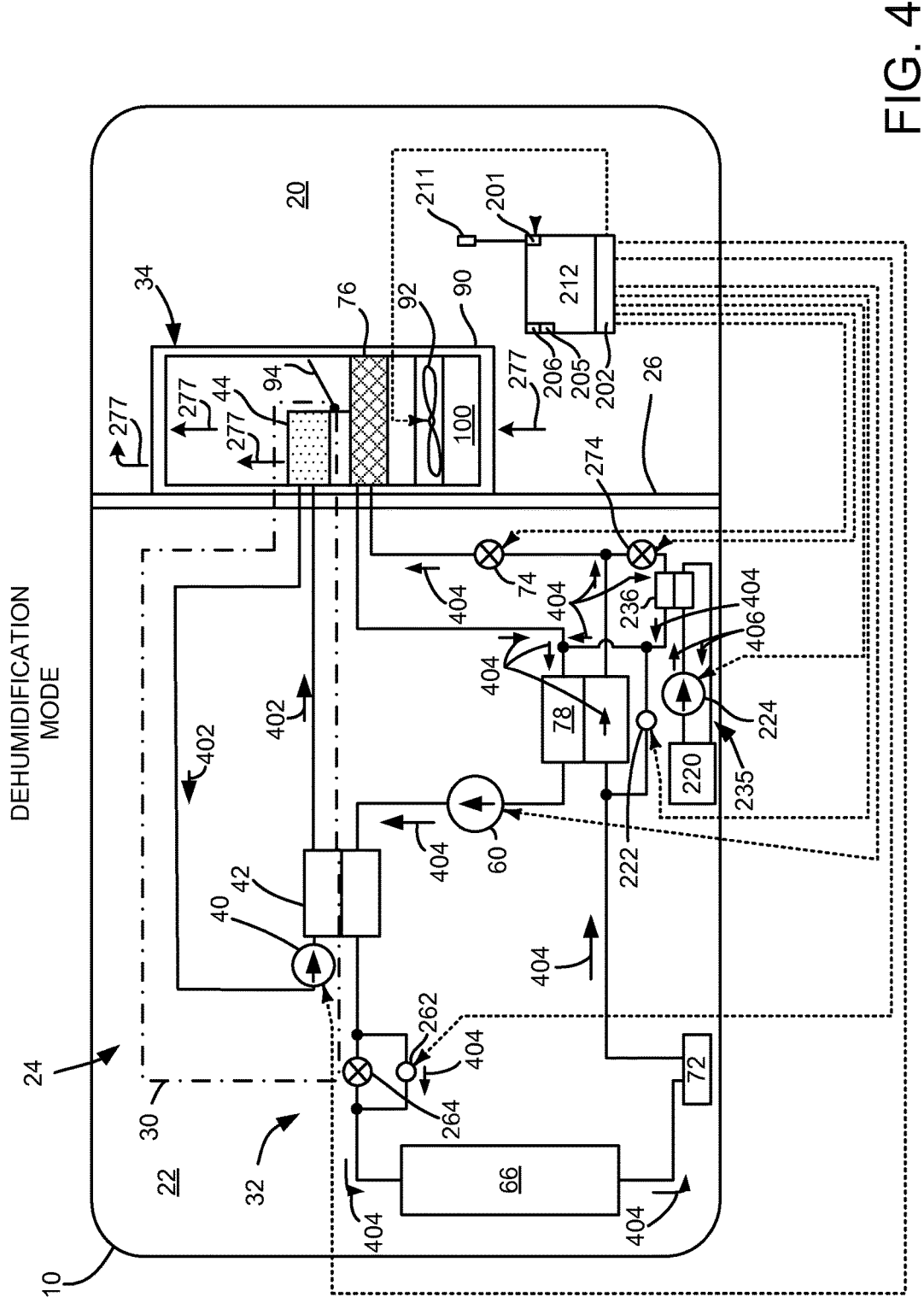
FIG. 4 shows the vehicle climate control system of FIG. 2 operating in a dehumidification mode.

Referring now to FIG. 4, climate control system 24 is the same as climate control system 24 shown in FIG. 2; however, FIG. 4 shows climate control system 24 operating in a dehumidification mode. Dehumidification mode provides for removing moisture from passenger compartment air and reheating the air. The dehumidification mode is activated by opening fixed area expansion device bypass valve 262, opening the shut-off valve of TXV 74, closing internal heat exchanger bypass valve 222, activating pump 60, activating fan 92, and activating coolant pump 40. The battery chiller TXV 274 shut-off valve and battery chiller pump 204 may be selectively activated. During dehumidification mode, refrigerant flows through heat pump subsystem 32 in the direction of arrows 404. Coolant flows in coolant subsystem 30 in the direction indicated by arrows 402. Coolant also flows through battery chiller loop 235 in the direction of arrows 406. Thus, dehumidification mode is similar to cooling mode, but coolant pump 40 is activated in dehumidification mode and not in cooling mode. Therefore, for the sake of brevity, the description of FIG. 2 applies except for the differences described hereafter.

Activating coolant pump 40 allows heat to be transferred from refrigerant in heat pump subsystem 32 to coolant in coolant subsystem 40 via intermediate heat exchanger 42. At least a portion of heat extracted from passenger compartment 20 via interior heat exchanger 76 may be returned to passenger compartment 20 via heater core 44. Moisture in passenger compartment air may be extracted by first cooling passenger compartment air at interior heat exchanger 76. The moisture reduced passenger compartment air may then be heated via heater core 44 to warm the passenger compartment or defrost vehicle windows.

Figure 5:
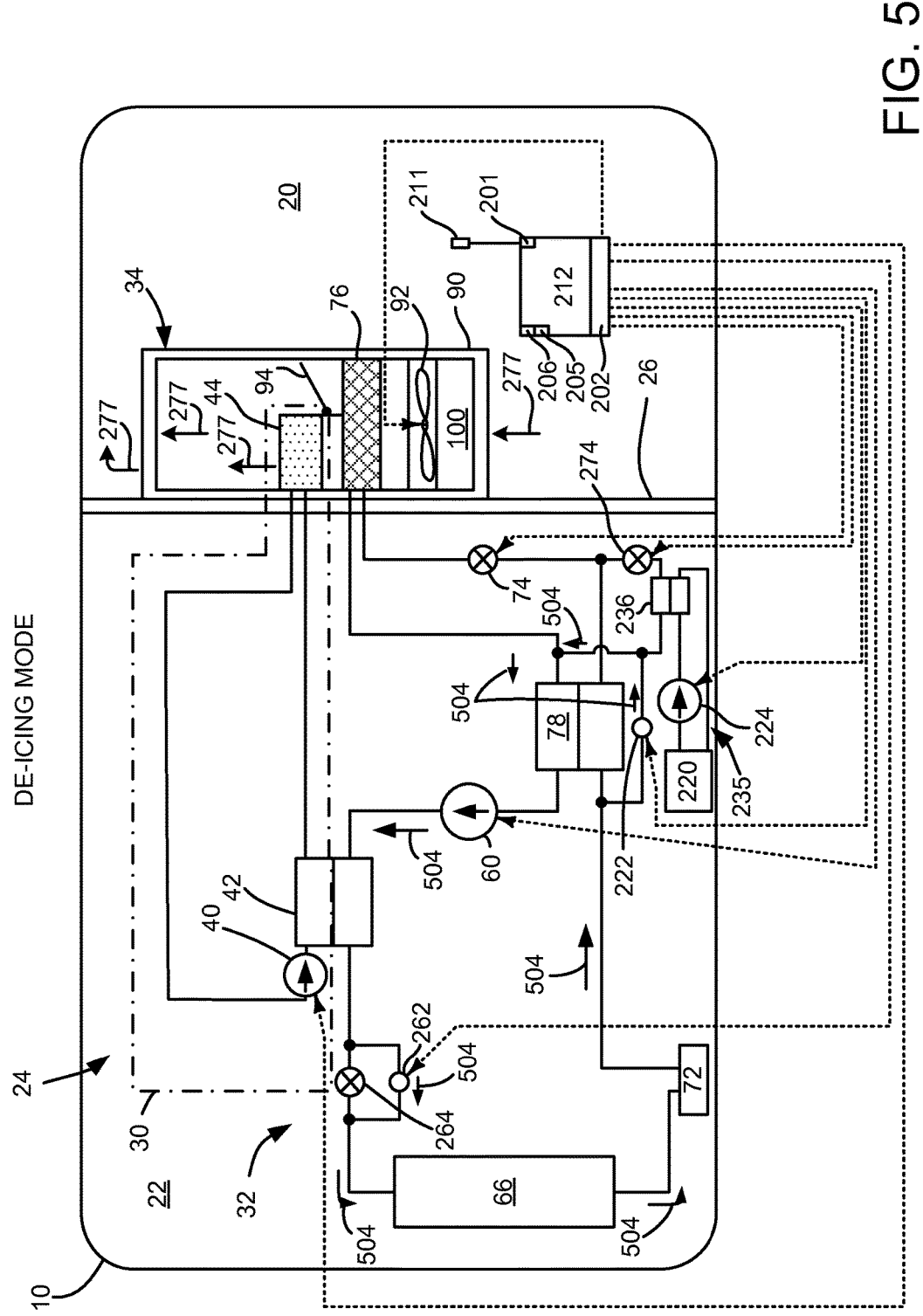
FIG. 5 shows the vehicle climate control system of FIG. 2 operating in a de-icing mode.
Figure 6:
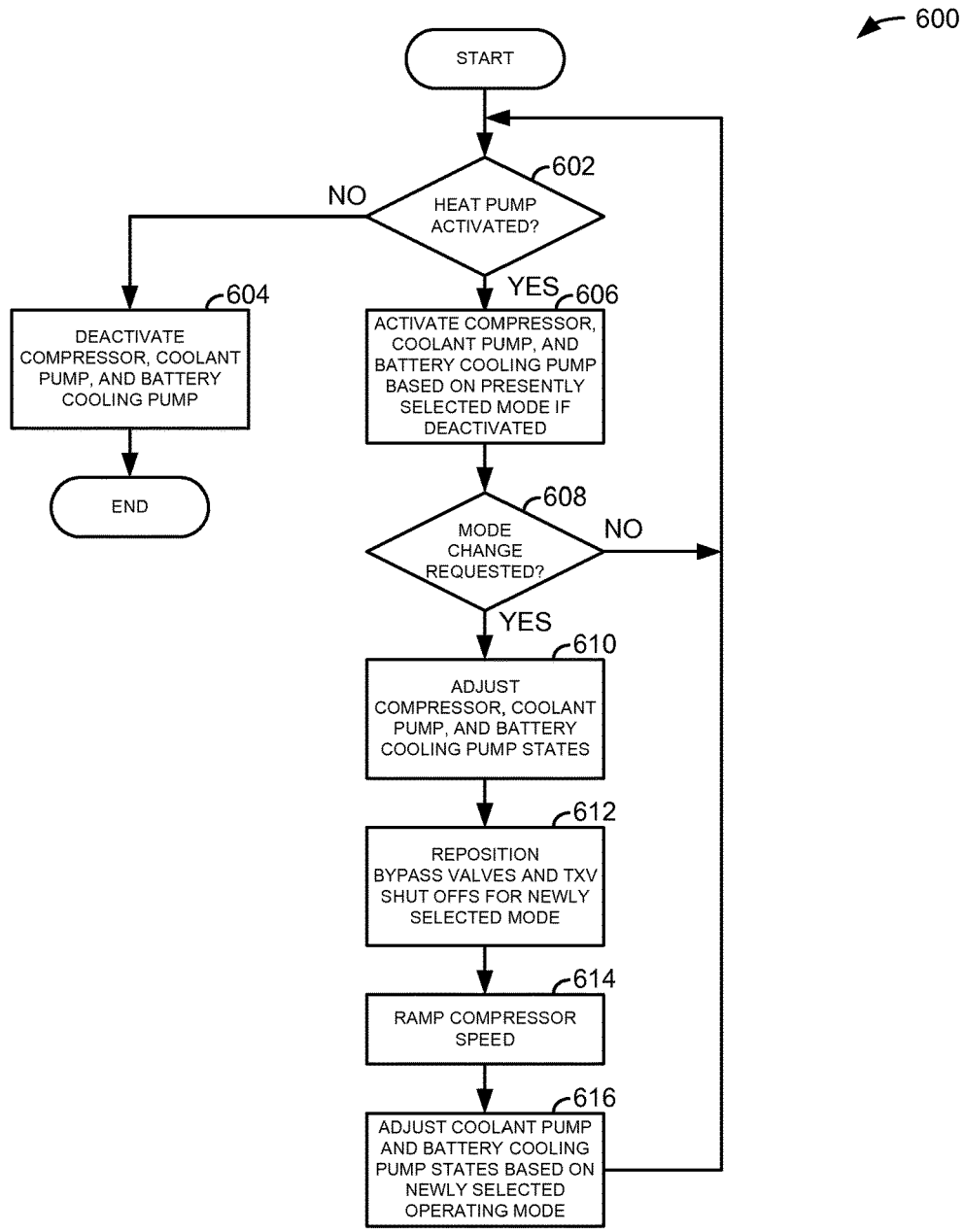
FIG. 6 shows an example method for transitioning the vehicle climate control system of FIG. 2 between various operating modes.

Referring now to FIG. 5, climate control system 24 is the same as climate control system 24 shown in FIG. 2; however, FIG. 5 shows climate control system 24 operating in a de-icing mode. De-icing mode provides for removing ice from exterior heat exchanger 66. The de-icing mode is activated by opening fixed area expansion device bypass valve 262, closing the shut-off valve of battery chiller TXV 274, closing the shut-off valve of TXV 74, opening internal heat exchanger bypass valve 222, activating pump 60. During heating mode, refrigerant flows through heat pump subsystem 32 in the direction of arrows 504.

In de-icing mode, refrigerant exits pump 60 and enters intermediate heat exchanger 42. Pump 60 increases refrigerant temperature as work is performed to compress the refrigerant. Intermediate heat exchanger 42 extracts little heat from the refrigerant. The refrigerant exits intermediate heat exchanger 42 and moves through fixed area expansion device bypass valve 262, thereby making fixed area expansion device 264 irrelevant. Refrigerant travels from the fixed area expansion device bypass valve 262 to the exterior heat exchanger 66. Heat is extracted from the refrigerant to de-ice fins within exterior heat exchanger 66. The refrigerant then enters receiver 72 where it may accumulate depending on demand.

Refrigerant exits receiver 72 and passes through internal heat exchanger bypass valve 222. The refrigerant then passes through a second side of internal heat exchanger 78 before returning to pump 60 where its temperature and pressure are increased. Refrigerant does not flow through interior heat exchanger 76 and battery chiller heat exchanger 236 in de-icing mode.

Thus, the system of FIGS. 1A-5 provides for a vehicle system, comprising: a coolant loop including a heater core in a passenger compartment; and a refrigerant loop including a first thermal expansion valve that does not include an electrically variable orifice positioned directly upstream of a heat exchanger in the passenger compartment, the refrigerant loop fluidically isolated from the coolant loop, the refrigerant loop in thermal communication with the coolant loop via an intermediate heat exchanger. The vehicle system includes where the refrigerant loop is part of a climate control system, and further comprising a controller including instructions to operate the climate control system in a heating mode, a cooling mode, a dehumidification mode, and a de-icing mode.

In some examples, the vehicle system includes where the dehumidification mode includes cooling passenger compartment air and heating passenger compartment air via the climate control system. The vehicle system further comprises a battery chiller loop. The vehicle system includes where the battery chiller loop includes a battery chiller pump, a battery chiller heat exchanger, and a battery. The vehicle system further comprises a second thermal expansion valve positioned upstream of a battery chiller heat exchanger, the second thermal expansion valve positioned upstream of the battery chiller heat exchanger not including an electrically variable orifice. The vehicle system includes where the thermal expansion valve includes a shut-off valve that stops refrigerant flow through the thermal expansion valve.

The systems also provide for a vehicle system, comprising: a coolant loop including a heater core in a passenger compartment; and a refrigerant loop including a first thermal expansion valve that does not include an electrically variable orifice positioned upstream of a heat exchanger in the passenger compartment, the refrigerant loop including a receiver directly coupled to an exterior heat exchanger, the refrigerant loop in thermal communication with the coolant loop via a heat exchanger. The vehicle system further comprises an internal heat exchanger. The vehicle system includes the receiver is directly coupled to the internal heat exchanger. The vehicle system further comprises a battery chiller loop. The vehicle system includes where the battery chiller loop includes a battery chiller pump, a battery chiller heat exchanger, and a battery. The vehicle system further comprises a second thermal expansion valve positioned upstream of a battery chiller heat exchanger, the second thermal expansion valve positioned upstream of the battery chiller heat exchanger not including an electrically variable orifice. The vehicle system includes where the first thermal expansion valve includes a shut-off valve that stops refrigerant flow through the first thermal expansion valve.

Referring now to FIG. 6, a method for operating a climate control system is shown. The method of FIG. 6 may provide the climate control system modes described in FIGS. 2-5. Further, at least portions of the method of FIG. 6 may be included in the system of FIGS. 1-5 as executable instructions stored in non-transitory memory. Further still, portions of the method of FIG. 6 may be actions taken in the physical world by a controller.

At 602, method 600 judges if the climate control system is activated. Method 600 may judge that the climate control system is activated based on input from a driver to a controller. If method 600 judges that the climate control system is activated, the answer is yes and method 600 proceeds to 606. Otherwise, the answer is no and method 600 proceeds to 604.

At 604, method 600 deactivates the climate control compressor, coolant pump, and battery cooling pump. However, the battery cooling pump may remain active if tempmerature leveling flow through the battery is desired. Further, power may be removed from the various expansion valve bypass valves and shut-off valves within the expansion valves so that the climate control system enters a default mode, such as heating mode. Alternatively, the various expansion valve bypass valves and shut-off valves within the expansion valves may be held in their present states. Method 600 proceeds to exit after the pumps and valves have been deactivated.

At 606, method 600 activates the climate control compressor, and coolant pump based on the presently selected climate control system operating mode. For example, if the climate control system is activated in a cooling mode, the coolant pump, compressor, and battery cooling pump are activated. In some examples, the climate control system may be activated in a same mode as a mode when the climate control system was deactivated. The battery cooling pump may be selectively activated in response to a request to cool the battery, which may be issued via a battery controller. Method 600 proceeds to 608 after selectively activating the compressor, coolant pump, and battery coolant pump.

At 608, method 600 judges if a climate control mode change is requested. A climate control mode change may be selected by a driver or automatically by a controller responding to ambient and passenger compartment conditions. For example, the climate control mode may be requested to transition from cooling mode to heating mode. If method 600 judges a climate control mode change is requested, the answer is yes and method 600 proceeds to 610. Otherwise, the answer is no and method 600 returns to 602.

At 610, the compressor, coolant pump, and battery cooling pump states are adjusted. In one example, the compressor, coolant pump, and battery cooling pump may be activated in a low energy use state. For example, less than a threshold amount of current may be supplied to each of the compressor, coolant pump, and battery coolant pump. In other examples, the climate control compressor, coolant pump, and battery cooling pump may be deactivated. The compressor, coolant pump, and battery cooling pump may be deactivated by stopping current flow to the devices. Method 600 proceeds to 612 after the devices are deactivated.

At 612, method 600 repositions the various expansion valve bypass valves, control valves, TXV shut-off valves for the newly selected climate control mode. The various valve states for the selected operating mode are provided in the description of FIGS. 1B-5. For example, if the newly selected climate control mode is selected for the system shown in FIG. 2. The cooling mode is activated by opening fixed area expansion device bypass valve 262, opening the shut-off valve of battery chiller TXV 274, opening the shut-off valve of TXV 74, and closing internal heat exchanger bypass valve 222. Method 600 proceeds to 614 after the various valves are operated according to the newly selected climate control mode.

At 614, method 600 begins to ramp up speed of the compressor. The compressor speed may be ramped up by gradually increasing current flow to the compressor. The compressor refrigerant flow may increase as compressor speed increases. Method 600 proceeds to 616 after compressor output is ramped.

At 616, method 600 adjusts operating states of the compressor, coolant pump, and battery chiller coolant pump based on the newly selected operating mode. For example, if heating mode is selected, the coolant pump is activated and the battery chiller coolant pump is not activated. Method 600 returns to 602 after the compressor, coolant pump, and battery chiller pumps operating states are adjusted.

Thus, for a transition from a first climate control operating mode to a second climate control operating mode, the various climate control pumps may be deactivated before repositioning valves in the system to allow refrigerant time to reach an equilibrium state before valve positions are changed to conform to the newly selected operating mode. After the various valves are in states for operating the climate control system in the selected mode, the compressor may be reactivated. This procedure may reduce the possibility of dead heading the compressor or entering other states that may degrade climate control system performance.

The method of FIG. 6 provides for a vehicle climate control method, comprising: receiving refrigerant to a receiver downstream of an exterior heat exchanger in a climate control system that includes an exterior heat exchanger, an interior heat exchanger, an internal heat exchanger, the refrigerant received in a cooling mode, a heating mode, a de-icing mode, and a dehumidification mode. The vehicle climate control method further comprises transitioning between cooling mode and heating mode via a procedure of first adjusting states of pumps in a vehicle climate control system. The vehicle climate control method further comprises switching operating states of one or more valves in the vehicle climate control system after adjusting operating states of pumps. The vehicle climate control method further comprises ramping up compressor speed after switching operating states of the one or more valves. The vehicle climate control method further comprises activating a coolant pump or a battery chiller pump after ramping up compressor speed. The vehicle climate control method includes where the climate control system further includes an intermediate heat exchanger.

As will be appreciated by one of ordinary skill in the art, methods described in FIG. 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other system hardware.

This concludes the description. The reading of it by those skilled in the art would bring to mind many alterations and modifications without departing from the spirit and the scope of the description. For example, the systems and methods described herein may be applied to full electric vehicles and vehicles that include an engine and an electric motor for propulsion.

The invention claimed is:

1. A vehicle system, comprising:
a coolant loop including a heater core in a passenger compartment; and
a refrigerant loop in thermal communication with the coolant loop via an intermediate heat exchanger and fluidically isolated from the coolant loop, the refrigerant loop including a passive fixed area expansion device which is disposed between, and directly coupled to, each of the intermediate heat exchanger and an exterior heat exchanger, the refrigerant loop further including an internal heat exchanger directly coupled to an interior heat exchanger.

2. The vehicle system of claim 1, where the refrigerant loop is part of a climate control system, and further comprising a controller including instructions to operate the climate control system in a heating mode, a cooling mode, a dehumidification mode, and a de-icing mode.

3. The vehicle system of claim 2, where the dehumidification mode includes cooling passenger compartment air and heating passenger compartment air via the climate control system.

4. The vehicle system of claim 1, further comprising a battery chiller loop, where the battery chiller loop includes a battery chiller pump, a battery chiller heat exchanger, and a battery.

5. The vehicle system of claim 1, further comprising a battery chiller thermal expansion valve positioned directly upstream of a battery chiller heat exchanger, wherein the battery chiller thermal expansion valve is positioned upstream of the battery chiller heat exchanger.

6. The vehicle system of claim 1, where the passive fixed area expansion device includes a shut-off valve that stops refrigerant flow through the passive fixed area expansion device.

7. The vehicle system of claim 1, further comprising a thermal expansion valve disposed between, and directly coupled to, each of the internal heat exchanger and the interior heat exchanger.

8. The vehicle system of claim 1, wherein the internal heat exchanger is configured to transfer thermal energy between refrigerant flowing through different regions of the refrigerant loop.

9. A vehicle system, comprising:
a coolant loop including a heater core in a passenger compartment; and
a refrigerant loop including a fixed area expansion device disposed between and directly coupled to each of an intermediate heat exchanger and an exterior heat exchanger, the refrigerant loop further including an internal heat exchanger directly coupled to an interior heat exchanger, and a receiver directly coupled to the exterior heat exchanger, wherein the refrigerant loop is in thermal communication with the coolant loop via the intermediate heat exchanger, and wherein the internal heat exchanger is configured to transfer thermal energy between refrigerant flowing through different regions of the refrigerant loop.

10. The vehicle system of claim 9, wherein the receiver is directly coupled to an outlet of the exterior heat exchanger, wherein the receiver is also directly coupled to the internal heat exchanger upstream of a first side of the internal heat exchanger, wherein the receiver is disposed between the exterior heat exchanger and the internal heat exchanger, and wherein a second side of the internal heat exchanger is positioned downstream of the interior heat exchanger in the refrigerant loop.

11. The vehicle system of claim 9, further comprising a battery chiller loop, where the battery chiller loop includes a battery chiller pump, a battery chiller heat exchanger, and a battery.

12. The vehicle system of claim 9, further comprising a battery chiller thermal expansion valve positioned upstream of a battery chiller heat exchanger.

13. The vehicle system of claim 9, where the fixed area expansion device includes a shut-off valve that stops refrigerant flow through the fixed area expansion device.

14. The vehicle system of claim 9, further comprising a thermal expansion valve disposed between, and directly coupled to, each of the internal heat exchanger and the interior heat exchanger.

15. A vehicle climate control method, comprising:
receiving refrigerant at a receiver positioned directly downstream of an outlet of an exterior heat exchanger and directly upstream of an inlet of a first side of an internal heat exchanger in a refrigerant loop of a vehicle climate control system, wherein the refrigerant loop includes the exterior heat exchanger, an interior heat exchanger, and the internal heat exchanger, wherein an inlet of a second side of the internal heat exchanger is directly fluidically coupled to an outlet of the interior heat exchanger, wherein the internal heat exchanger is configured to transfer thermal energy between refrigerant flowing through different regions of the refrigerant loop, and wherein the refrigerant is received in a cooling mode, a heating mode, a de-icing mode, and a dehumidification mode.

16. The vehicle climate control method of claim 15, further comprising transitioning between the cooling mode and the heating mode via a procedure of first adjusting operating states of pumps in the vehicle climate control system.

17. The vehicle climate control method of claim 16, further comprising switching operating states of one or more valves in the vehicle climate control system after first adjusting the operating states of the pumps.

18. The vehicle climate control method of claim 17, further comprising ramping up compressor speed after switching the operating states of the one or more valves.

19. The vehicle climate control method of claim 18, further comprising adjusting an operating state of a coolant pump or a battery chiller pump after ramping up the compressor speed.

20. The vehicle climate control method of claim 15, where the vehicle climate control system further includes an intermediate heat exchanger positioned upstream of an inlet of the exterior heat exchanger and downstream of an outlet of the second side of the internal heat exchanger.

* * * * *